United States Patent
Haciomeroglu et al.

(12) 
(10) Patent No.: US 11,890,494 B2
(45) Date of Patent: Feb. 6, 2024

(54) RETROFITTABLE MASK MOUNT SYSTEM FOR COGNITIVE LOAD REDUCING PLATFORM

(71) Applicant: Qwake Technologies, Inc., San Francisco, CA (US)

(72) Inventors: Omer Haciomeroglu, San Francisco, CA (US); John Davis Long, II, New York, NY (US); Michael Ralston, Mountain View, CA (US); Sam J. Cossman, San Francisco, CA (US)

(73) Assignee: Qwake Technologies, Inc., San Francisco, CA (US)

( * ) Notice: Subject to any disclaimer, the term of this patent is extended or adjusted under 35 U.S.C. 154(b) by 1280 days.

(21) Appl. No.: 16/374,619

(22) Filed: Apr. 3, 2019

(65) Prior Publication Data
US 2020/0147418 A1    May 14, 2020

Related U.S. Application Data

(60) Provisional application No. 62/758,438, filed on Nov. 9, 2018.

(51) Int. Cl.
| A62B 9/04 | (2006.01) |
| G06T 7/13 | (2017.01) |
(Continued)

(52) U.S. Cl.
CPC ............... *A62B 9/04* (2013.01); *A41D 13/11* (2013.01); *A62B 9/006* (2013.01); *G06T 5/003* (2013.01);
(Continued)

(58) Field of Classification Search
CPC .................................. G06T 7/13; G06V 20/20
See application file for complete search history.

(56) References Cited

U.S. PATENT DOCUMENTS

| 5,778,092 A | 7/1998 | MacLeod |
| 6,195,467 B1 | 2/2001 | Asimopoulos |
(Continued)

FOREIGN PATENT DOCUMENTS

| EP | 1168033 A1 | 1/2002 |
| EP | 1659890 B1 | 1/2009 |
(Continued)

OTHER PUBLICATIONS

Patent Cooperation Treaty: International Search Report and Written Opinion for PCT/US2020/048636 dated Nov. 24, 2020; 20 pages.
(Continued)

*Primary Examiner* — Yi Yang
(74) *Attorney, Agent, or Firm* — Marton Ribera Schumann & Chang LLP; Chien-Ju Alice Chuang

(57) ABSTRACT

A retrofittable mount system for a mask having a mask window comprises a sensor removably mounted to the mask to collect information about an environment as sensor data, wherein the sensor is removably mounted to the mask with a first mount mechanism that does not penetrate the mask window. A processor is coupled to the sensor, wherein the processor executes one or more cognitive enhancement engines to process the sensor data into enhanced characterization data. An output device is removably mounted to the mask with a second mount mechanism without penetrating the mask window. The output device receives the enhanced characterization data from the processor and communicates the enhanced characterization data to a mask wearer, such that the enhanced characterization data is integrated into natural senses of the wearer and optimized for the performance of a specific task of the wearer to reduce the cognitive load of the wearer.

15 Claims, 13 Drawing Sheets

(51) Int. Cl.
*G06V 20/20* (2022.01)
*A41D 13/11* (2006.01)
*A62B 9/00* (2006.01)
*G06T 5/00* (2006.01)
*H04N 5/33* (2023.01)

(52) U.S. Cl.
CPC ............... *G06T 7/13* (2017.01); *G06V 20/20* (2022.01); *H04N 5/33* (2013.01); *G06T 2207/10048* (2013.01); *G06T 2207/20192* (2013.01)

(56) References Cited

U.S. PATENT DOCUMENTS

| | | |
|---|---|---|
| 6,611,618 B1 | 8/2003 | Peli |
| 6,891,966 B2 | 5/2005 | Chen |
| 6,898,559 B2 | 5/2005 | Saitta |
| 6,909,539 B2 | 6/2005 | Korniski |
| 7,085,401 B2 | 8/2006 | Averbuch |
| 7,190,832 B2 | 3/2007 | Frost |
| 7,369,174 B2 | 5/2008 | Olita |
| 7,377,835 B2 | 5/2008 | Parkulo |
| 7,430,303 B2 | 9/2008 | Sefcik |
| 7,460,304 B1 | 12/2008 | Epstein |
| 7,598,856 B1 | 10/2009 | Nick |
| 8,054,170 B1 | 11/2011 | Brandt |
| 8,358,307 B2 | 1/2013 | Shiomi |
| 8,463,006 B2 | 6/2013 | Prokoski |
| 8,836,793 B1 | 9/2014 | Kriesel |
| 9,177,204 B1 | 11/2015 | Tiana |
| 9,498,013 B2 | 11/2016 | Handshaw |
| 9,728,006 B2 | 8/2017 | Varga |
| 9,729,767 B2 | 8/2017 | Longbotham |
| 9,875,430 B1 | 1/2018 | Keisler |
| 9,918,023 B2 | 3/2018 | Simolon |
| 9,924,116 B2 | 3/2018 | Chahine |
| 9,930,324 B2 | 3/2018 | Chahine |
| 9,995,936 B1 | 6/2018 | Macannuco |
| 9,998,687 B2 | 6/2018 | Lavoie |
| 10,033,944 B2 | 7/2018 | Högasten |
| 10,042,164 B2 | 8/2018 | Kuutti |
| 10,044,946 B2 | 8/2018 | Strandemar |
| 10,089,547 B2 | 10/2018 | Shemesh |
| 10,091,439 B2 | 10/2018 | Högasten |
| 10,122,944 B2 | 11/2018 | Nussmeier |
| 10,182,195 B2 | 1/2019 | Kostrzewa |
| 10,192,540 B2 | 1/2019 | Clarke |
| 10,230,909 B2 | 3/2019 | Kostrzewa |
| 10,230,910 B2 | 3/2019 | Boulanger |
| 10,244,190 B2 | 3/2019 | Boulanger |
| 10,249,032 B2 | 4/2019 | Strandemar |
| 10,250,822 B2 | 4/2019 | Terre |
| 10,338,800 B2 | 7/2019 | Rivers |
| 10,417,497 B1 | 9/2019 | Cossman |
| 10,425,603 B2 | 9/2019 | Kostrzewa |
| 10,436,887 B2 | 10/2019 | Stokes |
| 10,598,550 B2 | 3/2020 | Christel |
| 10,623,667 B2 | 4/2020 | Högasten |
| 10,803,553 B2 | 10/2020 | Foi |
| 10,909,660 B2 | 2/2021 | Egiazarian |
| 10,937,140 B2 | 3/2021 | Janssens |
| 10,962,420 B2 | 3/2021 | Simolon |
| 10,983,206 B2 | 4/2021 | Hawker |
| 10,986,288 B2 | 4/2021 | Kostrzewa |
| 10,986,338 B2 | 4/2021 | DeMuynck |
| 10,996,542 B2 | 5/2021 | Kostrzewa |
| 11,010,878 B2 | 5/2021 | Högasten |
| 11,012,648 B2 | 5/2021 | Kostrzewa |
| 11,029,211 B2 | 6/2021 | Frank |
| 2002/0020652 A1* | 2/2002 | Martinez ............... B64D 10/00 128/205.25 |
| 2003/0122958 A1 | 7/2003 | Olita |
| 2003/0190090 A1 | 10/2003 | Beeman |
| 2005/0150028 A1* | 7/2005 | Broersma ............... A42B 3/225 2/9 |
| 2006/0023966 A1 | 2/2006 | Vining |
| 2006/0048286 A1 | 3/2006 | Donato |
| 2007/0257934 A1 | 11/2007 | Doermann |
| 2008/0092043 A1 | 4/2008 | Trethewey |
| 2008/0146334 A1 | 6/2008 | Kil |
| 2011/0135156 A1 | 6/2011 | Chen |
| 2011/0239354 A1 | 10/2011 | Celona |
| 2011/0262053 A1 | 10/2011 | Strandemar |
| 2013/0050432 A1 | 2/2013 | Perez |
| 2013/0307875 A1 | 11/2013 | Anderson |
| 2014/0182593 A1* | 7/2014 | Duffy ............... A62B 23/025 128/206.19 |
| 2015/0025917 A1 | 1/2015 | Stempora |
| 2015/0067513 A1 | 3/2015 | Zambetti |
| 2015/0163345 A1 | 6/2015 | Cornaby |
| 2015/0172545 A1 | 6/2015 | Szabo |
| 2015/0202962 A1 | 7/2015 | Habashima |
| 2015/0244946 A1 | 8/2015 | Againn |
| 2015/0302654 A1 | 10/2015 | Arbouzov |
| 2015/0324989 A1 | 11/2015 | Smith |
| 2015/0334315 A1 | 11/2015 | Teich |
| 2015/0338915 A1 | 11/2015 | Publicover |
| 2015/0339570 A1 | 11/2015 | Scheffler |
| 2016/0097857 A1 | 4/2016 | Gokay |
| 2016/0187969 A1 | 6/2016 | Larsen |
| 2016/0260261 A1 | 9/2016 | Hsu |
| 2016/0295208 A1 | 10/2016 | Beall |
| 2016/0350906 A1 | 12/2016 | Meier |
| 2016/0360382 A1 | 12/2016 | Gross |
| 2017/0061663 A1 | 3/2017 | Johnson |
| 2017/0123211 A1 | 5/2017 | Lavoie |
| 2017/0192091 A1 | 7/2017 | Felix |
| 2017/0208260 A1* | 7/2017 | Terre ............... A62B 7/00 |
| 2017/0224990 A1 | 8/2017 | Goldwasser |
| 2017/0251985 A1 | 9/2017 | Howard |
| 2018/0012470 A1 | 1/2018 | Kritzler |
| 2018/0029534 A1 | 2/2018 | De Wind |
| 2018/0165978 A1 | 6/2018 | Wood |
| 2018/0189957 A1 | 7/2018 | Sanchez Bermudez |
| 2018/0204364 A1 | 7/2018 | Hoffman |
| 2018/0205893 A1 | 7/2018 | Simolon |
| 2018/0241929 A1 | 8/2018 | Bouzaraa |
| 2018/0266886 A1 | 9/2018 | Frank |
| 2018/0283953 A1 | 10/2018 | Frank |
| 2018/0330474 A1 | 11/2018 | Mehta |
| 2019/0141261 A1 | 5/2019 | Högasten |
| 2019/0228513 A1 | 7/2019 | Strandemar |
| 2019/0231261 A1 | 8/2019 | Tzvieli |
| 2019/0325566 A1 | 10/2019 | Högasten |
| 2019/0335118 A1 | 10/2019 | Simolon |
| 2019/0342480 A1 | 11/2019 | Kostrzewa |
| 2019/0359300 A1 | 11/2019 | Johnson |
| 2020/0005440 A1 | 1/2020 | Sanchez-Monge |
| 2020/0090308 A1 | 3/2020 | Lin |
| 2020/0141807 A1 | 5/2020 | Poirier |
| 2020/0193652 A1 | 6/2020 | Hoffman |
| 2020/0327646 A1 | 10/2020 | Xu |
| 2020/0349354 A1 | 11/2020 | Cossman |
| 2020/0401143 A1 | 12/2020 | Johnson |
| 2021/0080260 A1 | 3/2021 | Tremblay |

FOREIGN PATENT DOCUMENTS

| | | |
|---|---|---|
| WO | 2017/130184 A1 | 8/2017 |
| WO | 2018/167771 A1 | 9/2018 |

OTHER PUBLICATIONS

Khan et al., "Tracking Visual and Infrared Objects using Joint Riemannian Manifold Appearance and Affine Shaping Modeling" Dept. of Signals and Systems, Chalmers University of Technology, Gothenburg, 41296, Sweden; IEEE International Conference on Computer Vision Workshop (2011); pp. 1847-1854.

Patent Cooperation Treaty: International Search Report and Written Opinion for PCT/US2019/058635 dated Jan. 15, 2020; 14 pages.

(56) References Cited

OTHER PUBLICATIONS

Bretschneider et al., "Head Mounted Displays for Fire Fighters" 3rd International Forum on Applied Wearable Computing 2006; 15 pages.

Chen, "Reducing Cognitive Load in Mobile Learning: Activity-centered Perspectives" Published in International Conference on Networking and Digital Society; DOI: 10.1109/ICNDS.2010.5479459; pp. 504-507 (2010).

Fan, et al., "Reducing Cognitive Overload by Meta-Learning Assisted Algorithm Selection" Published in 5th IEEE International Conference on Cognitive Informatics; DOI: 10.1109/COGINF.2006.365686; pp. 120-125 (2006).

Gimel'Farb Part 3: Image Processing, Digital Images and Intensity Histograms; COMPSCI 373 Computer Graphics and Image Processing; University of Auckland, Auckland, NZ; Date unknown; 57 pages.

Haciomeroglu, "C-thru smoke diving helmet" Jan. 8, 2013; 15 pages; behance.com <http://ww.behance.net/gallery/6579685/C-Thru-Smoke-Diving-Helmet>.

Haciomeroglu, "C-thru smoke diving helmet" Jan. 8, 2013, 14 pages; coroflot.com <https://www.coroflot.com/OmerHaciomeroglu/C-Thru-smoke-Diving-Helmet>.

McKinzie, "Fire Engineering: The Future of Artificial Intelligence in Firefighting" Oct. 25, 2018; available at <https://www.fireengineering.com/articles/2018/10/artificial-intelligence-firefighting.html>; 16 pages.

Reis, et al., "Towards Reducing Cognitive Load and Enhancing Usability Through a Reduced Graphical User Interface for a Dynamic Geometry System: An Experimental Study" Proceedings—2012 IEEE International Symposium on Multimedia, ISM 2012. 445-450. 10.1109/ISM.2012.91; pp. 445-450 (2012).

Thomsen-Florenus, "Thermal Vision System" Berlin, Germany; Dec. 2017; 7 pages.

Wu et al., "Contract-Accumulated Histogram Equalization for Image Enhancement", IEEE SigPort, 2017. [Online]. Available at <http://sigport.org/1837>.

Wu, "Feature-based Image Segmentation, Texture Synthesis and Hierarchical Visual Data Approximation" University of Illinois at Urbana-Champaign, Apr. 2006; 61 pages.

* cited by examiner

FIG. 3A   FIG. 3B
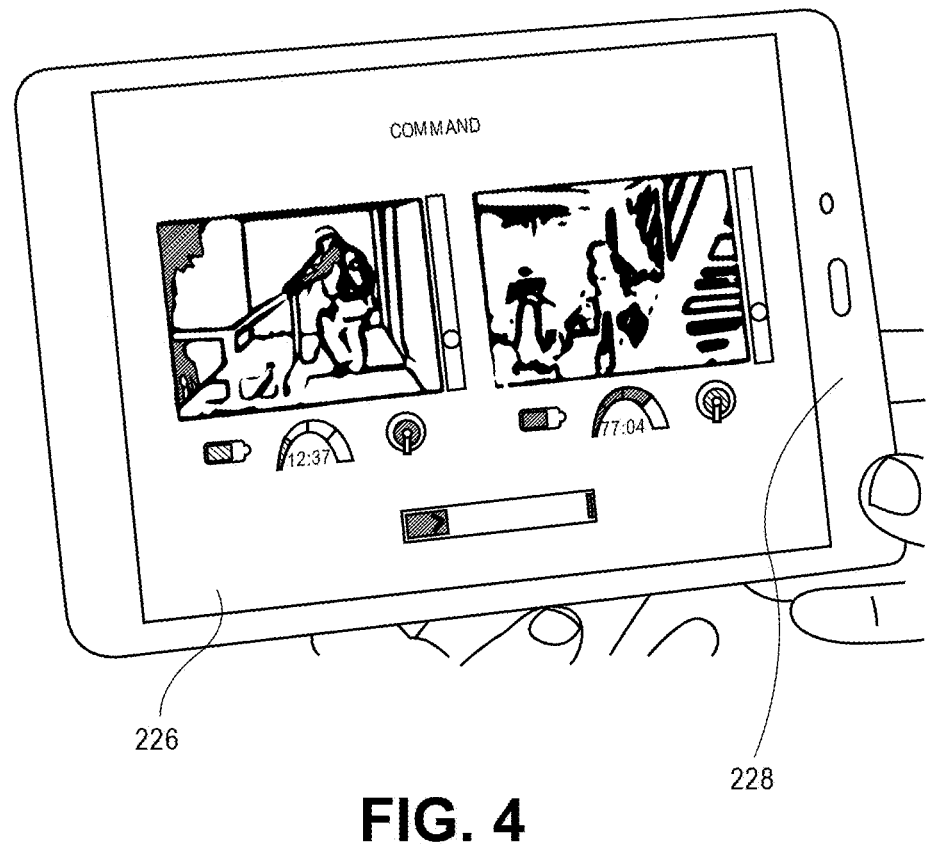
FIG. 4

RETROFITTABLE MASK MOUNT SYSTEM FOR COGNITIVE LOAD REDUCING PLATFORM

CROSS-REFERENCE TO RELATED APPLICATIONS

This application claims the benefit of provisional Patent Application Ser. No. 62/758,438, filed Nov. 9, 2018, assigned to the assignee of the present application, and incorporated herein by reference.

BACKGROUND

In high stress and oftentimes hazardous work environments-including firefighting, search & rescue, oil and gas, surgery, fighter pilots, mining, special ops, and the like, one false step has critical consequences, but so do too many slow steps. Go too fast and something life-threatening may be missed; go too slow and the results could be doubly devastating. The challenges of effectively and safely performing critical work in harsh and obscured environments have always existed. These challenges combine the physical strain imposed by hazardous terrain with the mental distress placed upon the individual operating within them. Critical human performance in high-stress environments is limited by how rapidly and effectively the brain can process impoverished or jumbled sensory inputs. Until now technology has been leveraged primarily to increase the amount of information provided to the senses, but not designed to specifically enhance the brain's existing (and unmatched) cognitive ability to make sense of that information.

For example, several emergency response systems are centered on the use of thermal imaging cameras (TICs) and augmented reality (AR) optics to provide a hands-free thermal display to the user. Current systems are typically carried by a crewmembers who must iteratively scan, mentally process and communicate what they perceive. Current handheld and hands-free TICs lack the computational resources and software required to unobtrusively offer advanced image processing and data visualization features to all crewmembers in real-time. This capability and time gap in the visual understanding of hazardous environments has been identified as a significant causative factor in responder line of duty deaths. Such systems cause crewmembers, such as first responders, to operate in a Stop, Look, Process and Remember paradigm, which is cumbersome and time consuming.

Accordingly, there is a need for improved methods and systems for integrating improved components, such as a TIC, with a government certified or compliant face mask, such as a self-contained breathing apparatus (SCBA), in a manner that the SCBA retains its certification after the integration.

BRIEF SUMMARY

The exemplary embodiment provides a retrofittable mount system for a mask having a mask window in a cognitive load reducing platform. A sensor is removably mounted to the mask to collect information about an environment as sensor data. The sensor is removably mounted to the mask with a first mount mechanism that does not penetrate the mask window. A processor is coupled to the sensor, wherein the processor executes one or more cognitive enhancement engines to process the sensor data from the sensor into enhanced characterization data. An output device is removably mounted to the mask with a second mount mechanism without penetrating the mask window. The output device electronically receives the enhanced characterization data from the processor and communicates the enhanced characterization data to a wearer of the mask. The enhanced characterization data is integrated into natural senses of the wearer and optimized for the performance of a specific task of the wearer to reduce the cognitive load of the wearer.

According to the method and system disclosed herein, once the components of the cognitive load reducing platform are integrated with a government certified or compliant face mask, such as a self-contained breathing apparatus (SCBA), for example, the nature of the noninvasive integration ensures that the SCBA retains its certification.

BRIEF DESCRIPTION OF SEVERAL VIEWS OF THE DRAWINGS

FIGS. 3A and 3B are diagrams illustrating an example of the enhanced images displayed on the display unit.

FIG. 4 is a diagram illustrating an example command and control interface of the cognitive load reducing platform.

DETAILED DESCRIPTION

Figure 1:
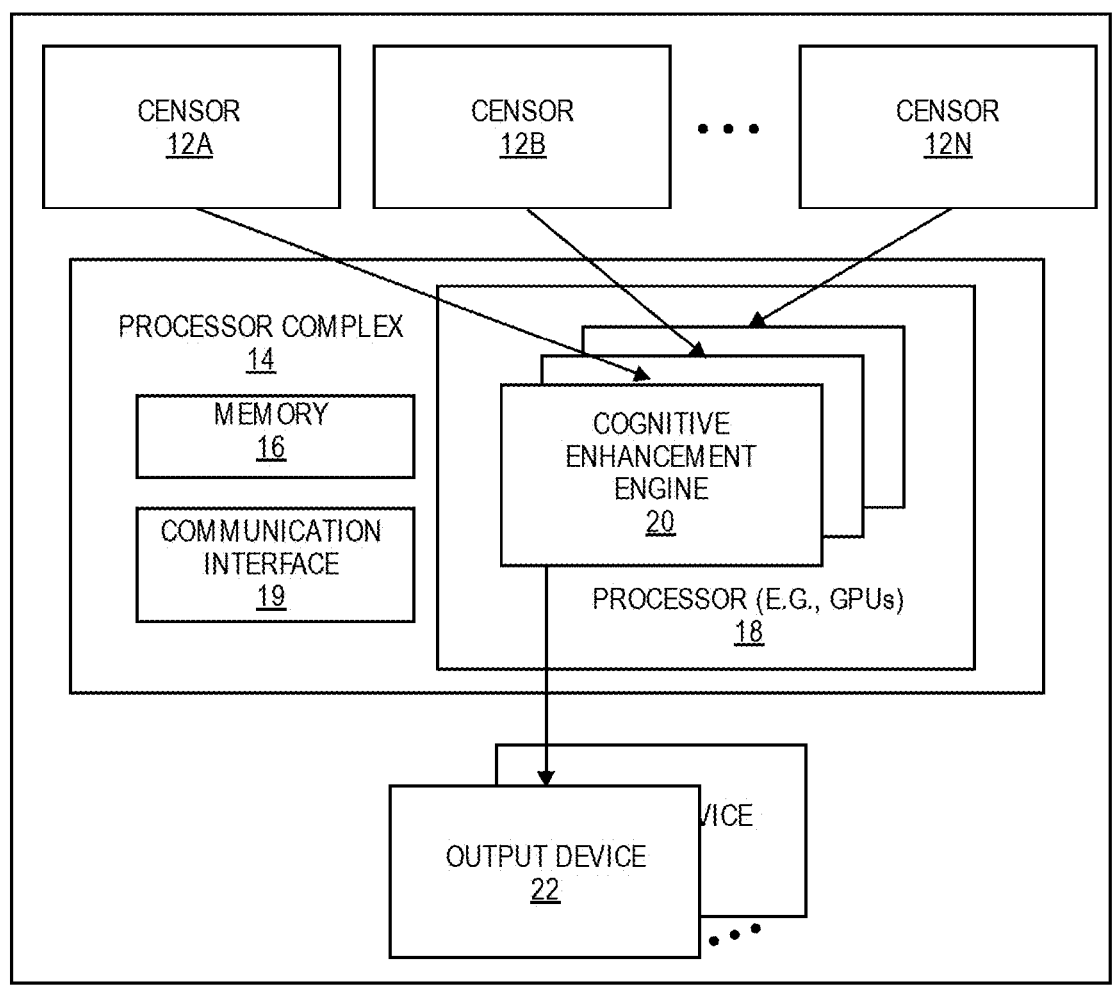
FIG. 1 is a diagram illustrating one embodiment of a cognitive load reducing platform according to one embodiment.

The exemplary embodiment relates to a retrofittable mask mount system for a cognitive load reducing platform. The following description is presented to enable one of ordinary skill in the art to make and use the invention and is provided in the context of a patent application and its requirements. Various modifications to the exemplary embodiments and the generic principles and features described herein will be readily apparent. The exemplary embodiments are mainly described in terms of particular methods and systems provided in particular implementations. However, the methods and systems will operate effectively in other implementations. Phrases such as "exemplary embodiment", "one embodiment" and "another embodiment" may refer to the same or different embodiments. The embodiments will be described with respect to systems and/or devices having certain components. However, the systems and/or devices may include more or less components than those shown, and variations in the arrangement and type of the components may be made without departing from the scope of the invention. The exemplary embodiments will also be described in the context of particular methods having certain steps. However, the method and system operate effectively for other methods having different and/or additional steps and steps in different orders that are not inconsistent with the exemplary embodiments. Thus, the present invention is not intended to be limited to the embodiments shown, but is to be accorded the widest scope consistent with the principles and features described herein.

In many critical, high-stress activities, such as firefighting, specialized tools have been developed to support challenging environments and critical objectives of crewmembers engaged in the high-stress activities. For the most part, these tools have evolved to support the crewmembers' physical needs—heat protection, airway protection, forcible entry, fire suppression, and the like. In the past 10-15 years, a greater focus has been placed on supporting the crewmembers' informational needs, including hazardous environment detection, communication, and safety alerting. For example, hearing aids, binoculars, and seismic sensors all increase the collection of information, but don't increase crewmembers' abilities to process or critically discern that extra information. Polarized glasses, gas monitors, thermal imagers, and the like all collect information, but still do not address the time and stress penalty required to absorb and interpret all that information. This "more is better" approach is both distracting and inefficient.

Unfortunately, often times stress is the limiting factor to crewmembers successfully completing these critical and dangerous activities. These are, by definition, high-stress environments and the difficulty in absorbing more and more information is made worse by stress. The health of the crewmembers is also compromised by stress, and regrettably contributes to a majority of crewmembers fatalities every year.

The exemplary embodiments are directed to a retrofittable mount system for a cognitive load reducing platform that leverages the principles of neuroscience and the tools of computer vision to reduce the cognitive load of a user and elevate human performance in high stress environments. The principles of neuroscience are used to integrate sensor data into the natural senses (e.g., visual perception) of the user in a manner that is optimized for the task at hand, e.g. search and rescue, and computer vision supplies the means in one embodiment. The cognitive load reducing platform significantly enhances the crewmembers' or user's ability to make well informed decisions rapidly when operating in complex environments where cognitive abilities decline. A premise of the cognitive load reducing platform is that if thinking and understanding are easier for crewmembers, then crewmembers can achieve objectives more rapidly, spend less time in harsh conditions, and have potentially reduced stress levels because of the real-time assurance or reinforcement of a human sense, i.e., vision, hearing and or touch. Example users of the cognitive load reducing platform include, but are not limited to, firefighters, surgeons, soldiers, police officers, search and rescue and other types of first responders.

FIG. 1 is a diagram illustrating one embodiment of a cognitive load reducing platform according to one embodiment. In one embodiment, the cognitive load reducing platform is a wearable electronic system worn on the body of a user when the user is engaged in complex, high stress environments that reduce cognitive abilities.

The cognitive load reducing platform 10 comprises, one or more sensors 12a-12n (collectively sensors 12) that collect information about an environment as sensor data. The information collected about the environment refers primarily to sensor data that can be used for navigation and detecting hazards, but also to a user's health status. In one embodiment, the sensors are worn by the crewmembers. For example, multiple sensors may be incorporated into a sensor package that is worn by one or more crewmembers. In another embodiment, other sensors may be remote from the crewmembers, such as on a drone equipped with a camera, toxicity detector, and the like.

Example categories of sensors include situational awareness sensors and biometric sensors for health status. The situational awareness sensors collect data about the user's external environment for environmental hazard detection and navigation. Examples of situational awareness sensors for hazard detection may include, but are not limited to: cameras (e.g., a TIC, a drone camera), a spectrometer, a photosensor, magnetometer, a seismometer, an acoustic sensor, a gas detector, a chemical sensor, a radiological sensor, a voltage detector, a flow sensor, a scale, a thermometer, a pressure sensor, and the like. Examples of situational awareness sensors used for user navigation may include, but are not limited to: an inertial measurement unit (IMU), a GPS sensor, a speedometer, a pedometer, an accelerometer, an altimeter, a barometer, an attitude indicator, a depth gauge, a compass (e.g., a fluxgate compass), a gyroscope, and the like. Examples of biometric sensors that measure health conditions/status of the user may include, but are not limited to: a heart rate sensor, a blood pressure monitor, a glucose sensor, an electrocardiogram (EKG or ECG) sensor, an electroencephalogram (EEG) sensor, an electromyography (EMG) sensor, a respiration sensor, and a neurological sensor.

The platform also includes a high-speed processor complex 14 coupled to the sensors 12. The high-speed processor complex 14 includes a memory 16, a communication interface 19, and one or more processors 18, such as graphics processor units (GPUs). The processor/GPUs 18 execute one more software-based cognitive enhancement engines 20 to process the sensor data from the sensors 12 into enhanced characterization data that incorporate contextual and physiological visuals, auditory and/or haptic cues. The cognitive load reducing platform 200 is sensor agnostic and as any type of sensor can be added to the platform as long a corresponding cognitive enhancement engine 20 is provided to process and present that sensor data.

The cognitive load reducing platform 10 further includes one or more output devices 22 coupled to the processor complex 14 to electronically communicate the enhanced characterization data to the user such that the enhanced characterization data is integrated into natural senses of the wearer in a manner that is optimized for the performance of a specific task of the user to reduce the cognitive load of the user. In one embodiment, the output devices 22 may be implemented as a visual display, headphones/ear buds and/ or a haptic device.

Prior solutions increase the amount of information provided to the user's senses without specifically enhancing the brain's existing (and unmatched) cognitive ability to make sense of that information. The cognitive load reducing platform 10, in contrast, filters, summarizes, and focuses sensor data into the enhanced characterization data comprising contextual and physiological visuals, audio and/or haptic cues to create a new category called "Assisted Perception" that significantly reduces complexity and cognitive load (and accompanying stress)—and decreases Time-To-Clarity required to save lives. The cognitive load reducing platform 10 is designed to reduce risk, improve human safety, and save lives. The platform has shown performance improvements of 267% (e.g., reducing the time to complete mission critical search and rescue tasks from 4.5 mins to 1.7 mins).

The cognitive load reducing platform supports the introduction of life-saving, Assisted Perception solutions to high-stress environments. One example use of this new category of Assisted Perception is as a firefighting vision system. In this embodiment, the cognitive load reducing platform is a real-time computer vision engine designed to aid first responders as they navigate smoke filled, hazardous environments with little or no visible light. In this embodiment, the cognitive load reducing platform increases the speed and safety of first responders in the field with a focus upon navigation and visual communication applications. The Assisted Perception of the cognitive load reducing platform dramatically enhances one's ability to make well informed decisions rapidly when operating in complex environments where cognitive abilities decline.

Several emergency response systems are based on the use of a thermal camera and AR optics to provide a hands-free imaging system to the user. However, the cognitive load reducing platform provides a novel integrated design of these hardware and software elements into a system that efficiently integrates into natural human visual perception in a manner that decreases stress in the field. In the first responder embodiment, the platform combines a unique combination of enhanced thermal imaging, augmented reality (AR), and environment visualization and mapping capabilities.

Figure 2A:
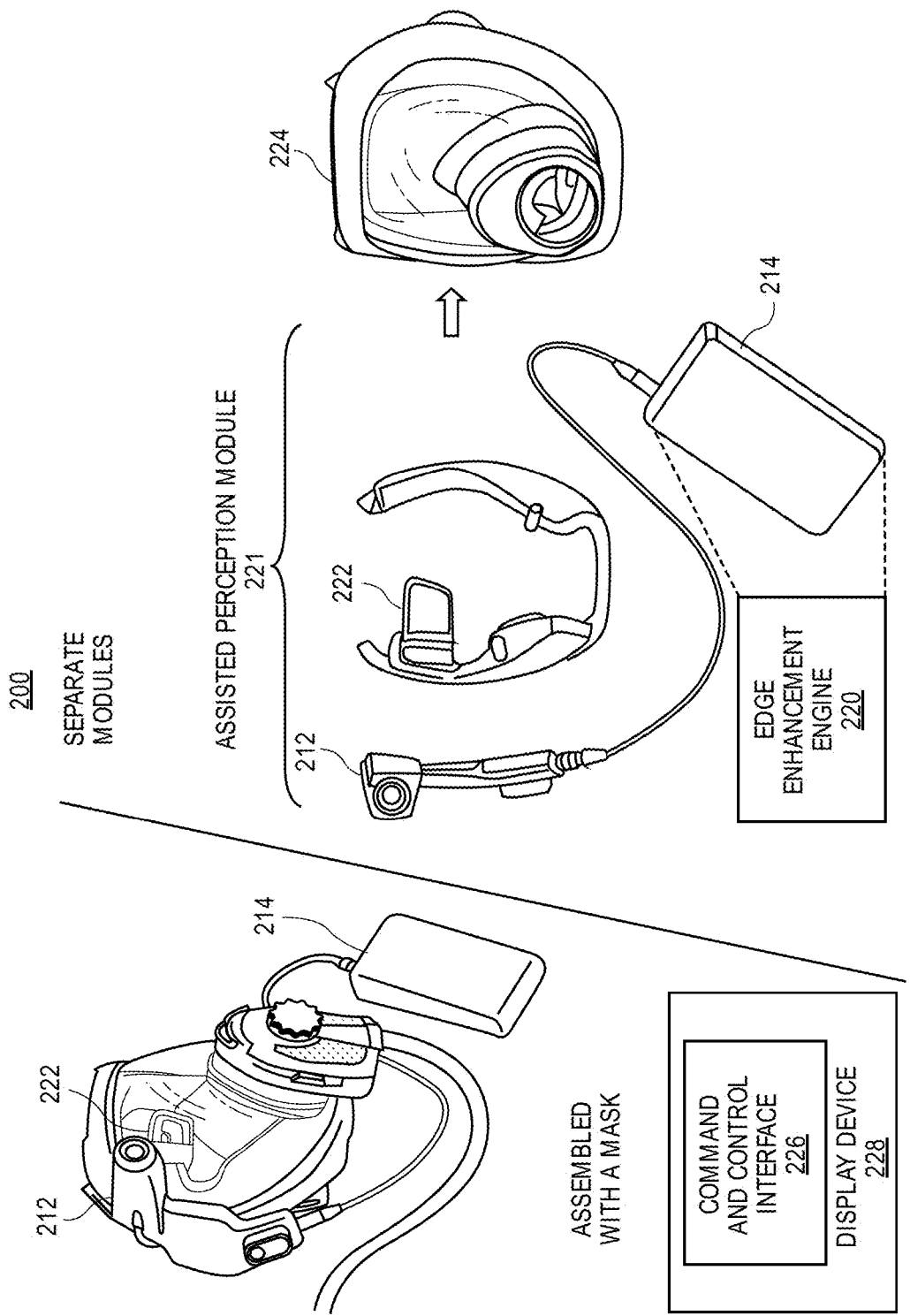
FIGS. 2A, 2B and 2C are diagrams illustrating components of the cognitive load reducing platform in a firefighting vision system embodiment.
Figure 2B:
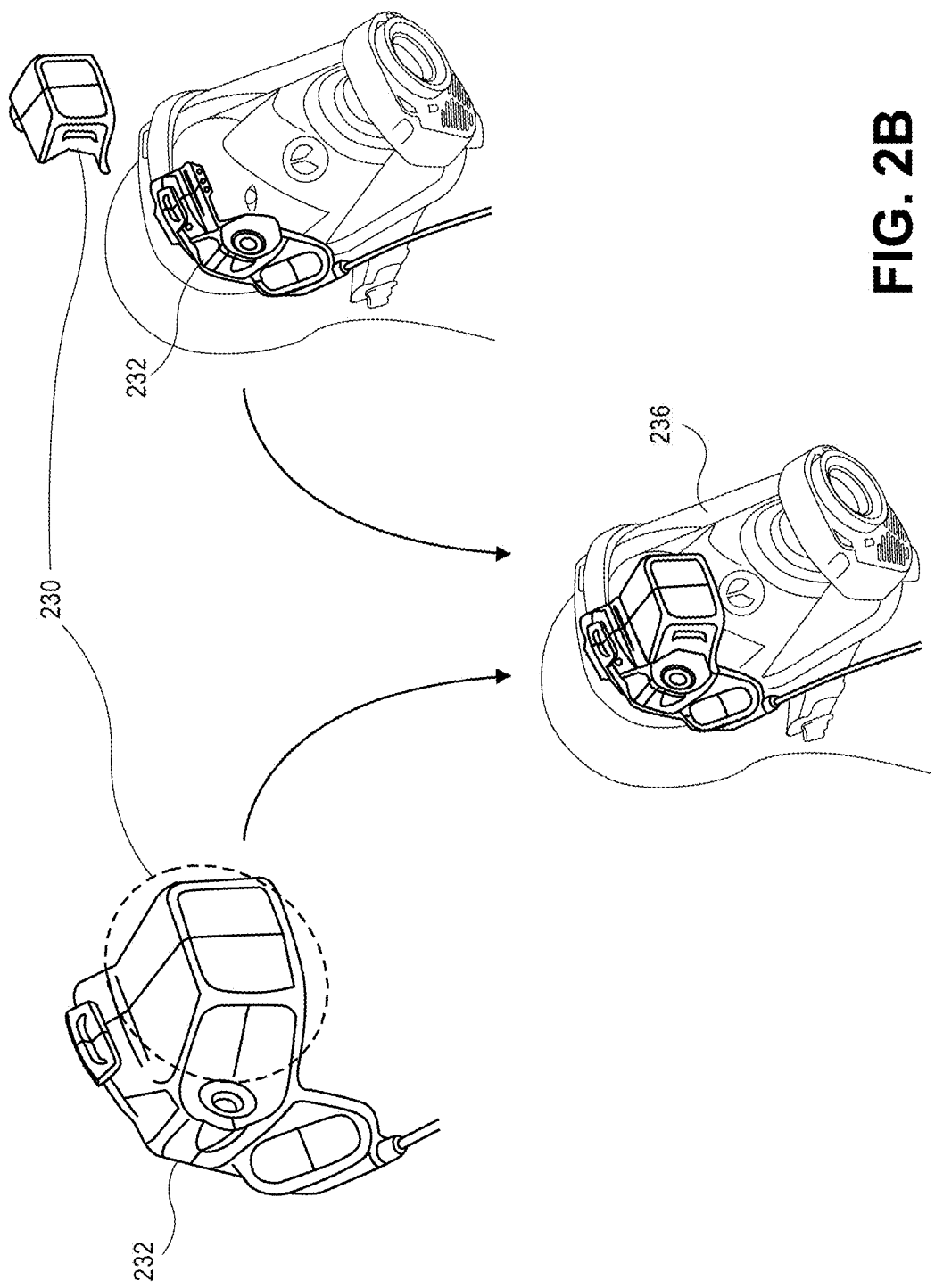

FIGS. 2A and 2B are diagrams illustrating components of the cognitive load reducing platform in the firefighting vision system embodiment. Referring to FIG. 2A, in one embodiment, the cognitive load reducing platform 200 comprises two components: i) an assisted perception module 221 integrated with a face mask 224 (or simply "mask") of the SCBA worn by each user/crewmember; and ii) a command and control interface 226 displayed on a display device 228 to a person of authority, such as an incident commander. The command and control interface 226 enables the person of authority to manage the incident and the crewmembers wearing respective assisted perception modules 221 by displaying the enhanced characterization data from each of the respective assisted perception modules.

Each of the assisted perception modules 221 comprises a modular set of components including a TIC 212, a processor complex 214 in communication with the TIC 212 for executing an edge enhancement engine 220, and a display unit 222, which is removably attached to the mask 224. In relation to FIG. 1, the TIC 212 in FIG. 2A comprises one of the sensors 12 of the platform 200, the display unit 222 comprises the output device 22, and the edge enhancement engine 220 comprises the cognitive enhancement engine 20 executed on the processor complex 214.

In the embodiment shown, the display unit 222 may comprise an augmented reality (AR) display unit, a virtual reality (VR) display unit, or a head-mounted projection display unit. In the AR embodiment, the AR display unit may comprise optical see through glasses that can be either binocular or monocular, or optics integrated into the mask window. FIG. 2A shows an embodiment where the display unit 222 comprises an AR monocular display.

FIG. 2B is a diagram showing a VR embodiment for the display unit. VR display unit 230 comprises an immersive headset that includes at least one display and sensors to track position and orientation (not shown). In the embodiment shown, the VR display unit 230 comprises a monocular display, although stereoscopic displays are also possible. The VR display unit 230 may be integrated within a housing of TIC 232 or is attachable to the TIC 232.

Figure 2C:
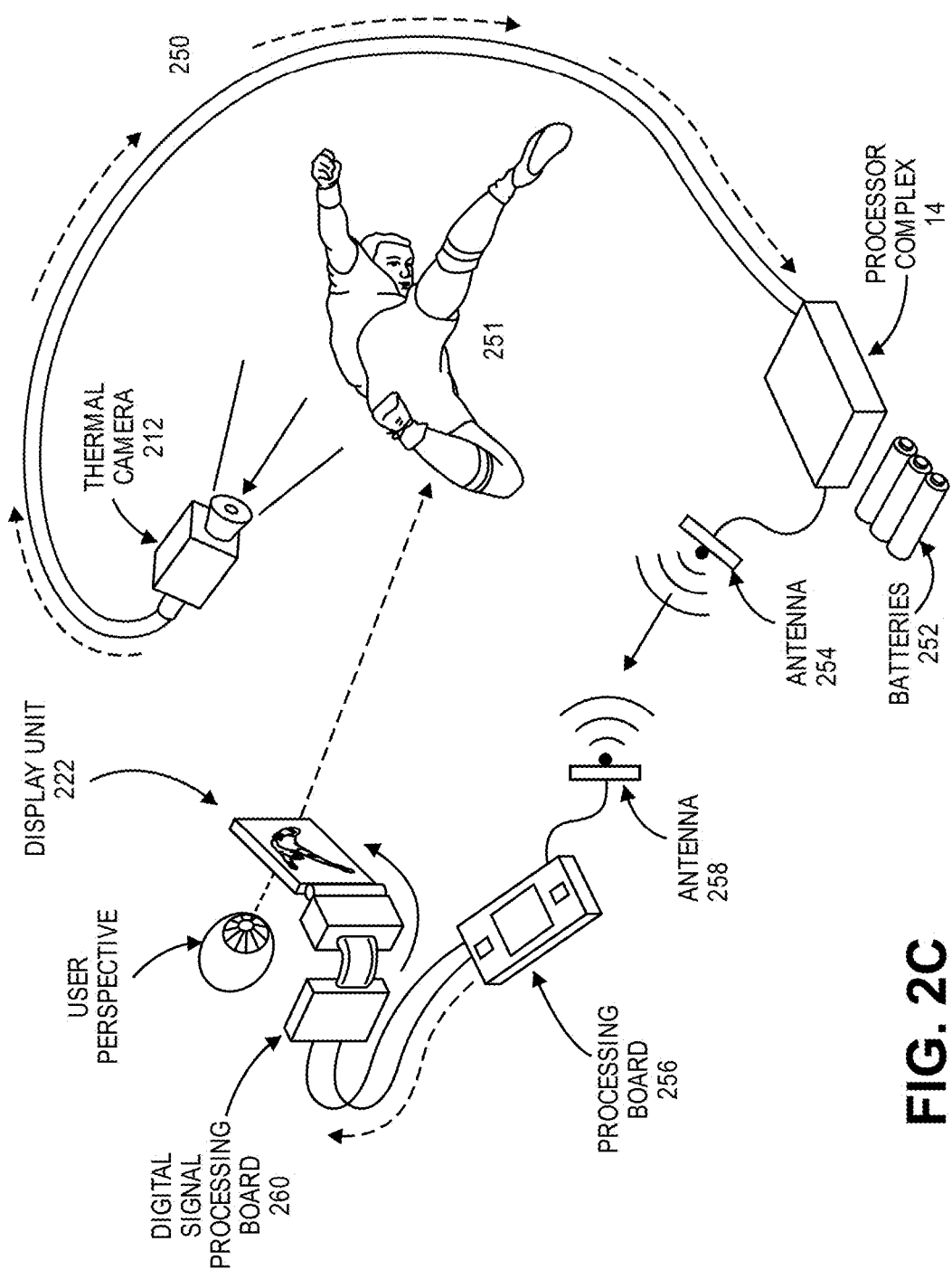

FIG. 2C is a diagram showing an exploded view of the assisted perception module 221 showing additional components in a wireless embodiment. The TIC 212 captures thermal image data of obstacles and objects 251 and sends the thermal image data via a cable 250 to the processor complex 14. The exploded view of the processor complex 14 shows that the processor complex 14 is powered by batteries 252 and the communication interface 19 of FIG. 1 is coupled to an antenna 254 to wirelessly transmit enhanced image data to the display unit 222. The display unit 222 further includes a processing board 256 with an antenna 258 to receive the enhanced image data wirelessly transmitted from the processor complex 14. The processing board 256 relays the enhanced image data to a digital signal processing board 260, which processes the enhanced image data for display on the display unit 222 directly in front of the user's eye.

As stated above, in one embodiment, the cognitive load reducing platform is a wearable electronic system. As such, there are many placement embodiments for the components of the cognitive load reducing platform. In most embodiments, all components are located on, or otherwise carried by, a user. For example, FIGS. 2A and 2B illustrate an embodiment where the TIC 212 (sensors 12) and the display unit 222 (output device 22) are carried by the user by virtue of being integrated with mask 224. The processor complex 214 is also worn by the user, such as being clipped to a belt or clothing, stowed in a pouch or a pocket, or attached to a back frame of the SCBA.

In some embodiments, however, the sensors 12 and/or the processor complex 14 may be located remote from the user. As an example, consider the use case where a remote gas sensor controlled by a third party sends gas data to a cognitive enhancement engine 20 executed by the processor complex 14 to process. In one embodiment, the gas sensor data from the remote gas sensor could be pushed to the cognitive load reducing platform where the sensor data is processed locally by the corresponding cognitive enhancement engine 20. However, in another, the processor complex 14 may be implemented as a remote server in the cloud that wirelessly receives sensor data of various types. A third party could collect and push the gas sensor data into the cognitive load reducing platform in the cloud where the processor complex 14 converts an output into a brain optimized visual format sent for display to the user on the output device 22.

There are also many communication embodiments for the components of the cognitive load reducing platform. For example, in the embodiment shown in FIGS. 2A and 2B, the TIC 212 communicates with the processor complex 214 over a wired connection via cable 250. However, in an alternative embodiment, the TIC 212 wirelessly communicates with the processor complex 14. In the embodiment shown in FIGS. 2A and 2B, the processor complex 214 communicates with the display unit over a wireless connection. However, in an alternative embodiment, the processor complex 214 communicates with the display unit over a wired connection. In yet a further embodiment, the TIC 212 and the processor complex 214 may be integrated together within a common housing, in which case the TIC 212 is in direct communication with the processor complex 214, and the communication between the processor complex 214 and the display unit 222 could be over a wired or wireless connection. In either embodiment, the display unit 222 would still communicate wirelessly with the central command display device 228.

In one embodiment, the display unit 222 (including digital signal processing board 260, processing board 256, and antenna 258) is mounted inside the mask 224. However, in an alternative embodiment, the display unit 222 is mounted outside the mask 224. For example, the display itself may be positioned outside the mask 224, while the digital signal processing board 260, processing board 256 and antenna 258, may be worn by the user, such as being clipped to a belt or clothing, stowed in a pouch or a pocket, or attached to a back frame of the SCBA.

According to one aspect of the disclosed embodiments, the edge enhancement engine 220 in the firefighting embodiment performs high speed processing on the thermal images from the TIC 212 to enhance the edges or outlines of objects and obstacles and projects the enhanced outlines as an AR image on the AR glasses/monocle in the user's field of view, so the user can see and effectively navigate in obscure conditions without overwhelming the user's ability to process the displayed information. The edge enhancement engine 220 provides a stream of visual formation to field of view of the wearer that increases the luminosity and contrast of edges in the image to appear as a decluttered, enhanced cartoon image. In this embodiment, the enhanced cartoon image produced by the platform dramatically enhances the user's ability to make well-informed decisions rapidly when operating in complex environments where cognitive abilities decline, such as a first responder (e.g., fire fighter or search and rescue personnel).

FIGS. 3A and 3B are diagram illustrating example enhanced images displayed on the display unit 222. The enhanced images of the disclosed embodiments have enhanced edges and a decluttered appearance after processing of thermal images/video by the cognitive load reducing platform. As shown, the assisted perception module 221 enables the user to see in dark, smoke-filled environments. However, seeing through smoke is a side benefit to the value of the cognitive load reducing platform, which is to reduce the visual complexity of hazardous environments, while allowing individuals to more easily make sense of their surroundings.

The Assisted Perception provided by the cognitive load reduction platform leverages the principles of neuroscience to enhance aggregated sensor data in real-time to allow first responders to do their jobs significantly faster and more safely. The closest competitor to an infrared sensor-based, extreme environment tool, would be the handheld or helmet mounted infrared camera and display systems. However, none of these systems offer any context-specific interpretive processing of the output, nor are they designed as true augmented reality interfaces that reduce the cognitive load of the user.

Referring again to FIG. 2A, the wireless capabilities of the processor complex 14 is to also create a shared experience between the crewmembers and the incident commander (IC) via the command and control interface 226. According to the present embodiment, the command and control interface 226 runs on the display device 228 to the incident commander and is associated or paired to a group of the assisted perception modules 221 worn by crewmembers. Through its wireless capabilities, each assisted perception module 221 streams its enhanced image to the command and control interface 226 on the display device 228 so that the incident commander can see in real time what the crewmembers see. Thus, the platform improves situational awareness on the front lines as well as to create a shared operating picture with the commander on the backend through a cognitive load reducing command and control interface 226 that aggregates information and presents insights to the commander via a simplified GUI based on similar principals of neuroscience.

FIG. 4 is a diagram illustrating an example command and control interface of the cognitive load reducing platform. In one embodiment, the display device 228 comprises a tablet computer or large mobile phone, and the command and control interface 226 comprises multiple subpanels or frames for displaying the streams from each of the assisted perception modules 221 of the crewmembers (e.g., up to 8). There are two communication modes. In the first communication mode, the incident commander can select any subpanel to engage in audio or visual icon based communication. In the second communication mode, the incident commander can broadcast to all of the assisted perception modules 221 equipped crewmembers in the field. The assisted perception modules 221 may use high-performance GPUs and openGL ($\geq$3.3) algorithms to render this interactive, multiple panel display.

Traditional emergency response tools to aid the incident commander focus upon the Incident Commander's ability to integrate information unavailable to the crewmembers, and to then communicate these insights via radio channels. In contrast, the cognitive load reducing platform allows the incident commander to see the moment to moment visual experience of their crewmembers and to communicate back to them using visual cues displayed to crewmembers equipped with assisted perception modules 221. Consequently, the connected nature of the platform (streaming visual data between assisted perception modules 221 to the central command display device 228) elevates the safety of the entire workspace by providing a shared operating picture between individuals in the field and leaders monitoring workers from the periphery.

Retrofittable Mask Mount System

In one embodiment, the cognitive load reducing platform 10 may be implemented as an OEM-ready system that makes use of currently available SCBAs. Accordingly, the cognitive load reducing platform 10 further comprises a retrofittable mask mount system to allow components of the cognitive load reducing platform 10 to integrate with the face mask 224 of a SCBA, for example, without penetrating the mask or otherwise compromising certifiability of the mask. The retrofittable mask mount system also enables the components to reside in and around the face mask 224 in an ergonomic and balanced manner.

As used herein, the term SCBA is intended to include any type of breathing apparatus that may be worn by rescue workers, firefighters, cave/mine explorers, divers, industrial workers, medical staff and others, to provide breathable air in an immediately dangerous to life or health atmosphere (IDLH). Examples types of SCBA's may include, but are not limited to a breathing apparatus (BA), a compressed air breathing apparatus (CABA), and a self-contained underwater breathing apparatus (SCUBA). The main components of a conventional SCBA typically include a face mask, an inhalation connection (mouthpiece) and regulator hose, and a high pressure tank mounted to a back frame.

Figure 5:
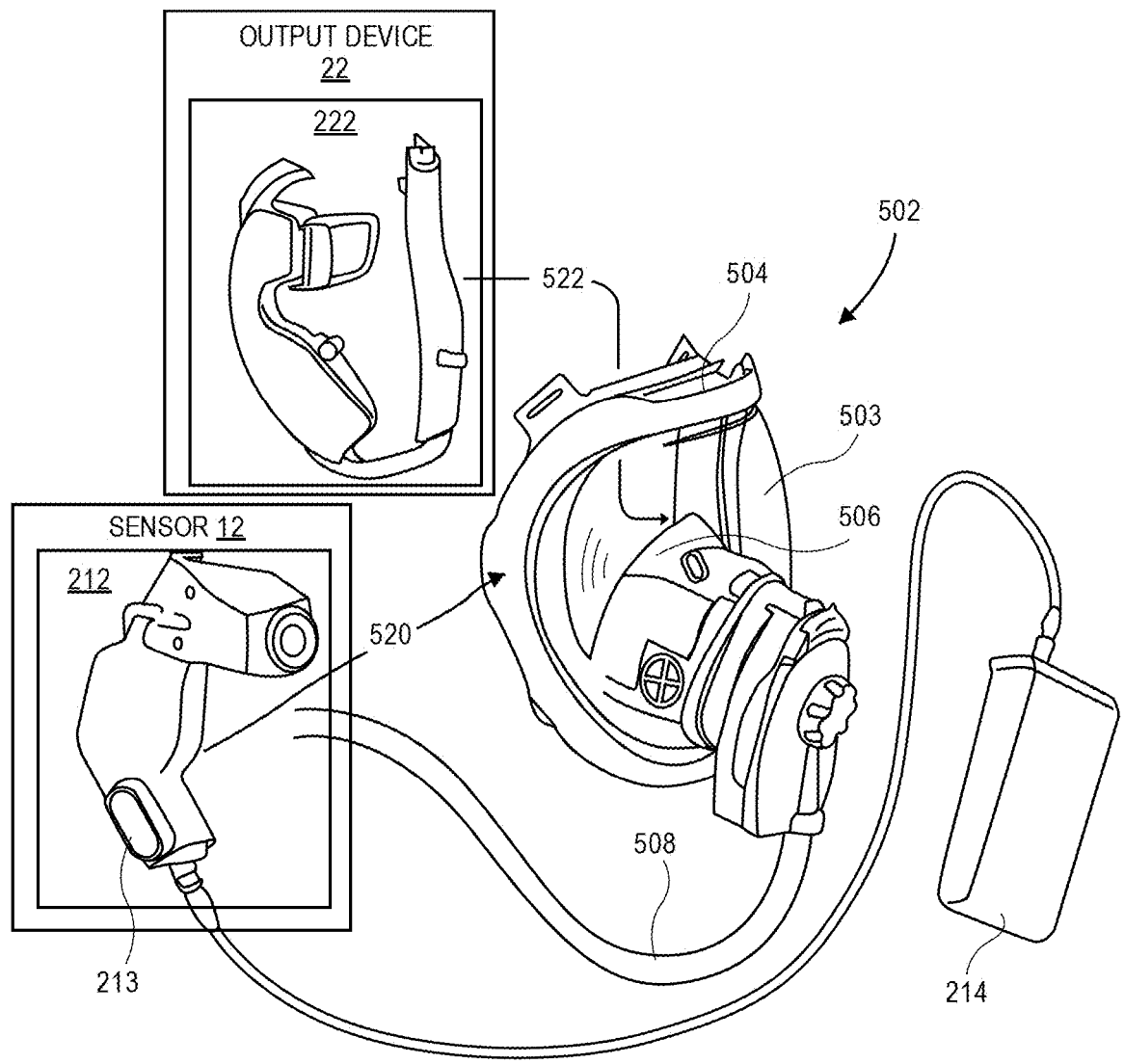
FIG. 5 illustrates the retrofittable mask mount system noninvasively integrating components of the cognitive load reducing platform with a conventional face mask.

FIG. 5 illustrates the retrofittable mask mount system noninvasively integrating components of the cognitive load reducing platform with a conventional face mask. The face mask 502 (or simply "mask") comprises a mask window 503 enclosed by a mask frame 504, and an inhalation connection 506 to connect to a regulator hose 508 that attaches to a high-pressure tank (not shown). The retrofittable mask mount system comprises a sensor 12 removably mounted to the face mask 502 to collect information about an environment as sensor data, where the sensor 12 is removably mounted to the face mask 502 with a first mount mechanism 520 that does not penetrate the mask window 502.

In one embodiment, the first mount mechanism 520 for mounting the sensor 12 may fit on the existing mask frame 504, rather than on the mask window so as to not impede vision. The first mount mechanism 520 may removeably mount the sensor 12 to mask 502 without the need of tools by any means. In one embodiment, for example, the first mount mechanism 520 removeably mounts the sensor 12 using any type of mechanical fastener that joins two (or more) objects or surfaces. In one embodiment, the first mount mechanism 520 uses a latch mechanism with negative surface matching. Other embodiments for the latch mechanism may include a spring-loaded connector, a magnetic snap, a hook-and-loop fastener, a built-in flexible compliant hinge, and a clamp, for instance. In one embodiment, the latch mechanism with negative surface matching includes a combination of pins and/or wedges. Other attachment mechanisms are possible. In one embodiment, the latch mechanism may be integrated to work with built-in quick release connectors on the mask frame 504.

The sensor 12 may include a protective housing enclosure for the sensor (impact/heat/humidity/vibration). The sensor 12 may incorporate a switch 213 button (conductive, electromechanical or mechanical) in the housing in some embodiments to allow the user to switch 213 between different processed sensory outputs based on user experience. The switch 213 is ergonomically placed on the sensor 12 based on the use case. In one embodiment, the sensor 12 may comprise TIC 212.

The processor complex 214 receives sensor data collected by sensor 12 and processes the sensor data into enhanced characterization data. In one embodiment, the processor complex 214 may be implemented with a ruggedized enclosure that is preferably heat, humidity and impact resistant. The enclosure may be carried by a wearer on an item of clothing or on/in a back frame the SCBA. Examples of item of clothing include a belt, jacket or pants of the user. In another embodiment, the processor complex 214 may be implemented as a server located remote from the user, such as in the cloud.

The output device 22 is removably mounted to the face mask 502 that electronically receives the enhanced characterization data from the processor complex 214 and communicates the enhanced characterization data to a wearer of the face mask 502. In one aspect of the disclosed embodiments, the output device 22 is attached to the face mask 502 using a second mount mechanism 522 that does not penetrate the mask window 502. The output device 22 communicates the enhanced characterization data to a wearer of the mask, such that the enhanced characterization data is integrated into natural senses of the wearer and optimized for the performance of a specific task of the user to reduce the cognitive load of the wearer. In the embodiment where the output device 22 is a display device 222, the enhanced characterization data comprises a stream of visual images that is ergonomically aligned to the wearer's line of sight with edges of objects in the images having increased luminosity and contrast (over baseline thermal images) and appear as decluttered, enhanced line drawings.

Due to the first and second mount mechanisms 520 and 522, once the cognitive load reducing platform is integrated with a government certified or compliant SCBA guidelines/standards, the nature of the non-invasive integration ensures that the SCBA retains its certification. Examples of such SCBA guidelines/standards include, but are not limited to: SCBAs guidelines established by the National Fire Protection Association, NFPA Standard 1981 for firefighting; National Institute for Occupational Safety and Health (NIOSH) certification for SCBAs that are used in chemical, biological, radiological, and nuclear (CBRN) environments; Personal Protective Equipment Directive (89/686/EEC) for SBCAs used in Europe (see European Standard EN 137: 2006).

Figure 6A:
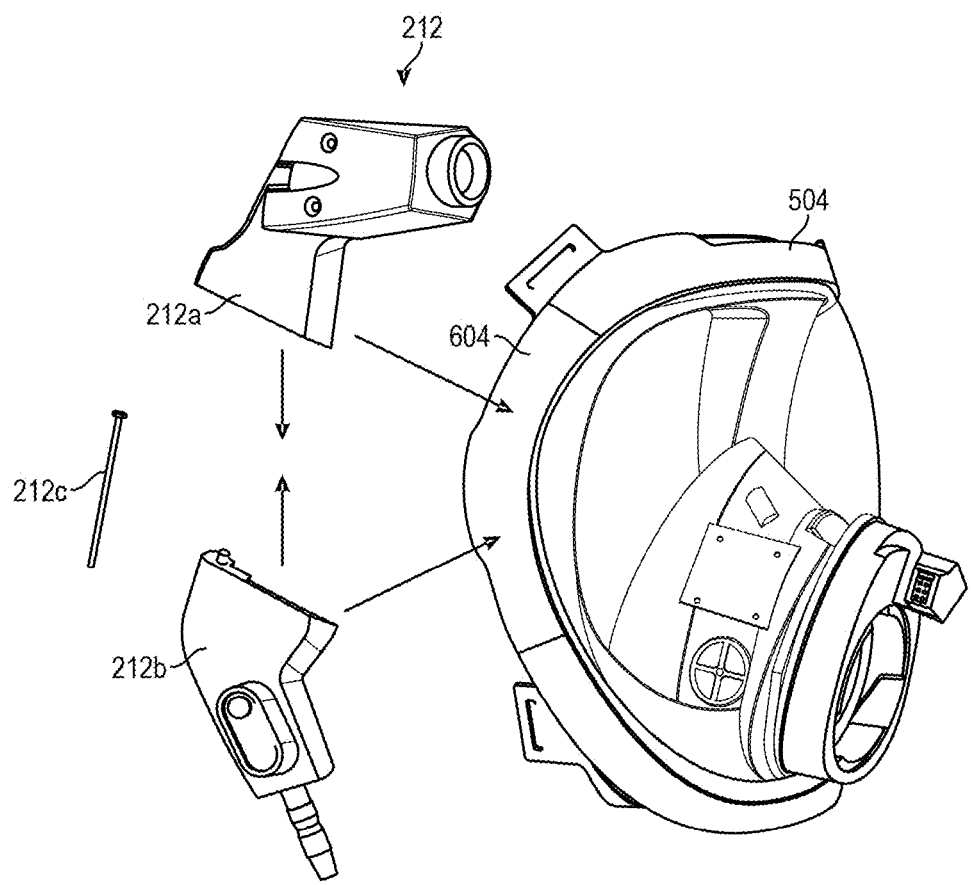
FIGS. 6A-6C illustrate an example embodiment for the sensor in and the first attachment mechanism that mounts the sensor to the face mask.
Figure 6B:
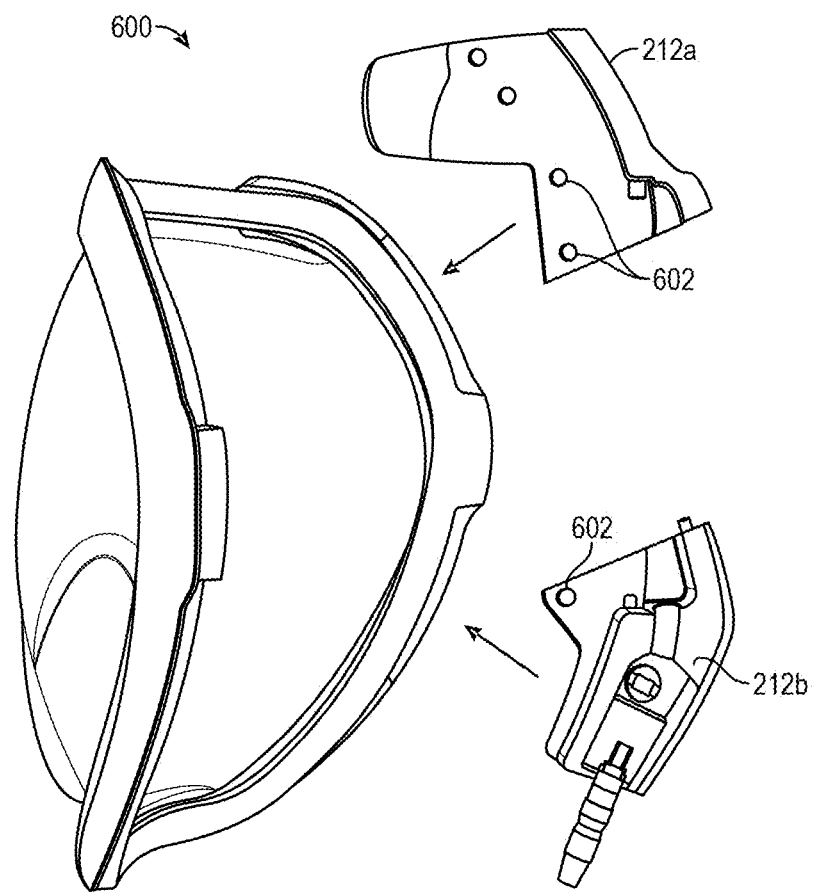
Figure 6C:
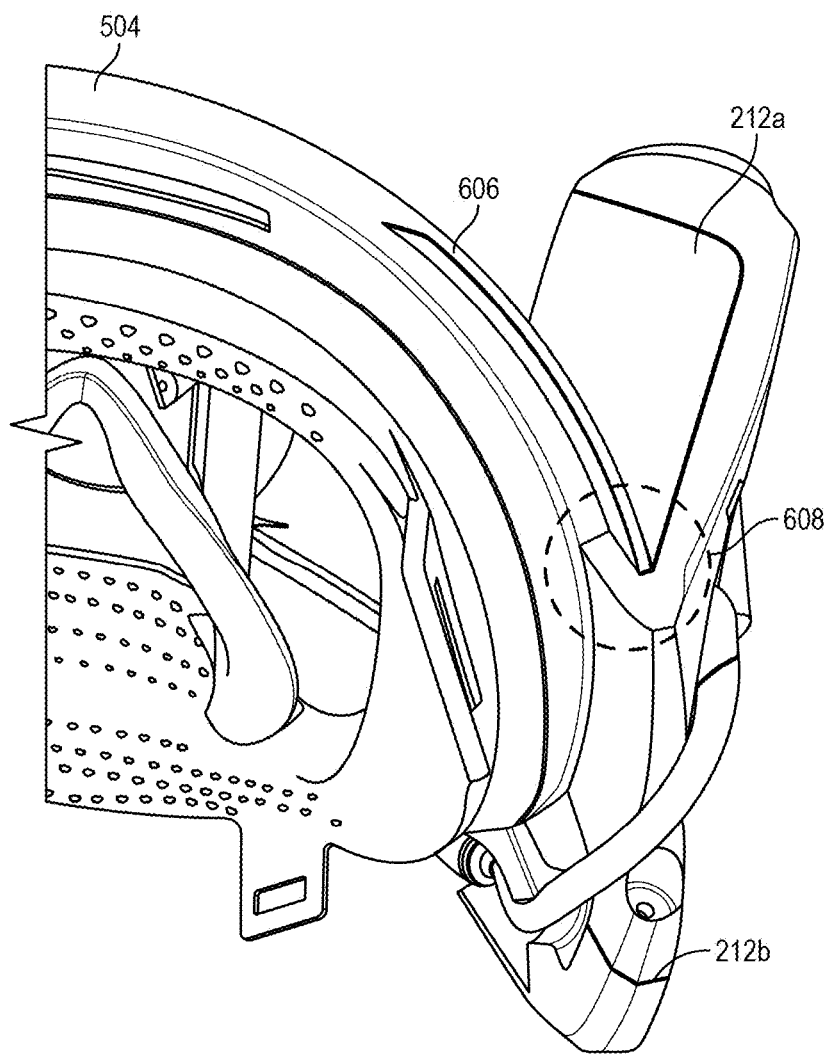

FIGS. 6A-6C illustrate an example embodiment for the sensor and the first attachment mechanism that mounts the sensor 12 to the face mask 502. In one embodiment, the sensor 12 may include a housing to hold the actual sensor unit on the face mask (and to route any cables). The housing may comprise a single component or multiple components. FIGS. 6A and 6B show an example of the housing of the TIC 212 comprising multiple components. In this embodiment, the housing of the TIC 212 may comprise an upper housing bracket 212a and a lower housing bracket 212b that are attached to one another by a bracket bolt and nut 212c running vertically though the upper housing bracket 212a and the lower housing bracket 212b.

Regardless of whether the housing of the TIC 212 comprises a single component or multiple components, the first mount mechanism 520 uses a latch mechanism with negative surface matching in one embodiment. Other embodiments for the latch mechanism may include a spring-loaded connector, a hook-and-loop fastener, a built-in flexible compliant hinge, and a clamp, for instance. Compliant hinges/mechanisms are those that do not use a multi-part hinge but rather use flexible hinge mechanisms that take advantage of material properties to form the hinge. In one embodiment, the latch mechanism with negative surface matching includes a combination of pins and/or wedges, as described below.

FIGS. 6A-6C illustrate components of the first attachment mechanism 600 on the housing that mounts the TIC 212 to the face mask 502 by a latch mechanism with negative surface matching. In one embodiment, the latch mechanism may comprise a combination of pins and one or more wedges. More specifically, the negative surface matching map be implemented as bracket snap-end spacer clip pins 602 and a wedge portion 608 formed in the housing of the TIC 212. In one embodiment, the bracket snap-end spacer clip pins 602 are located along a side of the TIC 212 facing the face mask 502 and rest on an outer surface 604 of the mask frame 504. In the two-component embodiment, the bracket snap-end spacer clip pins 602 are located on both the upper housing bracket 212a and the lower housing bracket 212b to press on sides of the mask frame. FIG. 6C shows that the first attachment mechanism 600 further includes a wedge portion 608 located along a longitudinal side of the housing of the TIC 212 to fit over a flange portion 606 of the mask frame 504. Together, the bracket snap-end spacer clip pins 602 and the wedge portion 608 inserted over the flange portion 606 act as a retaining latch to keep the housing of TIC 212 fixed in place on the mask frame 504. To remove the TIC 212, the user bends back the wedge portion 608 until it no longer engages the flange portion 606 and lifts the TIC 212 away from the mask frame 504.

Figure 7:
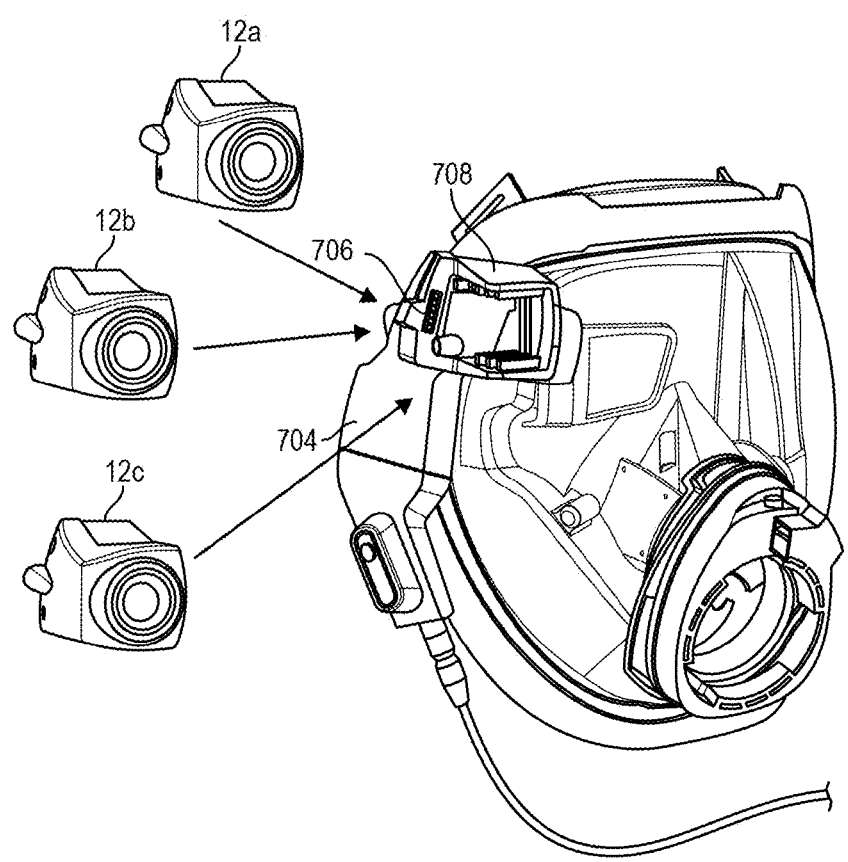
FIG. 7 illustrate another embodiment for the sensor and the first attachment mechanism that mounts different sensors to the face mask.

FIG. 7 illustrate another embodiment for the sensor and the first attachment mechanism that enables different sensors to be mounted to the face mask 502. In this embodiment, the first attachment mechanism comprises a housing 704 of the sensor, where the housing includes a receiving frame 708 with a spring-loaded pin connector 706 for removalably attaching different types of sensors 12a, 12b, and 12c having connectors that are compatible with the spring-loaded pin connector 706. Accordingly, this embodiment of the first attachment mechanism enables different types of sensors 12a, 12b and 12c to be snapped in and out for easy substitution in the field as required. Once a sensor is attached (e.g., snapped in) the spring-loaded pin connector 706, the processor complex may automatically identify the sensor and load the corresponding cognitive enhancement engine 20 to process the sensor output for presentation on the output device.

According to a further embodiment, the face mask includes a first built-in connector on the outside of the mask frame to receive and mate with a matching connector on a sensor 12 or the processor complex. But the face mask may also include a second built-in connector on the inside of the mask frame to receive and mate with a matching connector on the display unit. The first and second built-in connectors may be coupled to one another to provide a direct connection between the TIC/processor complex and the display unit.

Figure 8:
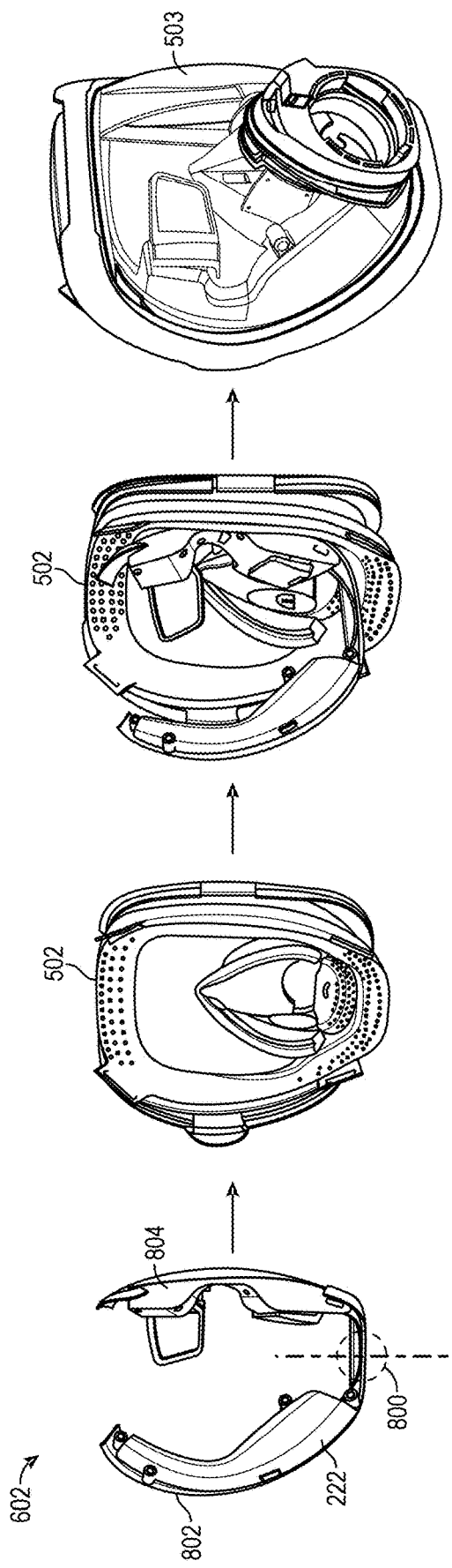
FIG. 8 illustrates components comprising the second attachment mechanism that mounts the output device to the face mask.

FIG. 8 illustrates components comprising the second attachment mechanism 522 that mounts the output device 22 to the face mask 502. In one embodiment, the second mount mechanism 522 mounts the output device 22 inside the face mask 502 in a fixed, but manually removable manner (i.e., without the need of tools). In the embodiment where the output device 22 is an display unit 222, the second attachment mechanism 522 may comprise a flexible bridge 800 connecting a left frame member 802 and a right frame member 804. The left frame member 802 and a right frame member 804 have contours that substantially match the contours of the interior of the face mask 502. The display unit 222 is self-powered by batteries, which may be housed in the left frame member 802, while the right frame member 804 may house the optical display or vice versa. The display unit 222 may include a glass frame around the optics to protect the wave guide optics. In another embodiment, the display unit 222 may be AR goggles in which case the optics could be attached to the left frame member 802 as well. In one embodiment, weight is distributed evenly across the vertical axis of display unit 222 to be less encumbering.

According to the present embodiment, to affix or mount the display unit 222 inside the face mask 502 using the second attachment mechanism 522, a user slightly folds the left frame member 802 and/or the right frame member 804 inwards about the vertical axis of the flexible bridge 800 (step 1). The slightly folded display unit 222 is then inserted into the face mask 502 wherein once released the left frame member 802 and the right frame member 804 flex back to an original shape and press against the contours of the interior of mask window 502 (step 2). The user then releases pressure on the left frame member 802 and the right frame member 804 and the display unit 222 is held in place by spring-like pressure against the mask window 502 (step 3). Once the display unit 222 is mounted inside the face mask 502, the display unit 222 is implemented such that the flexible bridge 800, the left frame member 802 and the right frame member 804 do not affect an in-mask airflow path that keeps the mask visor glass cool.

In a first embodiment shown in FIG. 5, the assisted perception module 221 has been described with a wireless connection between the processor complex 214 and the display unit 222. However, in a second embodiment, the processor complex 214 and the display unit 222 may communicate through a wired connection, as shown in FIGS. 9A and 9B.

Figure 9A:
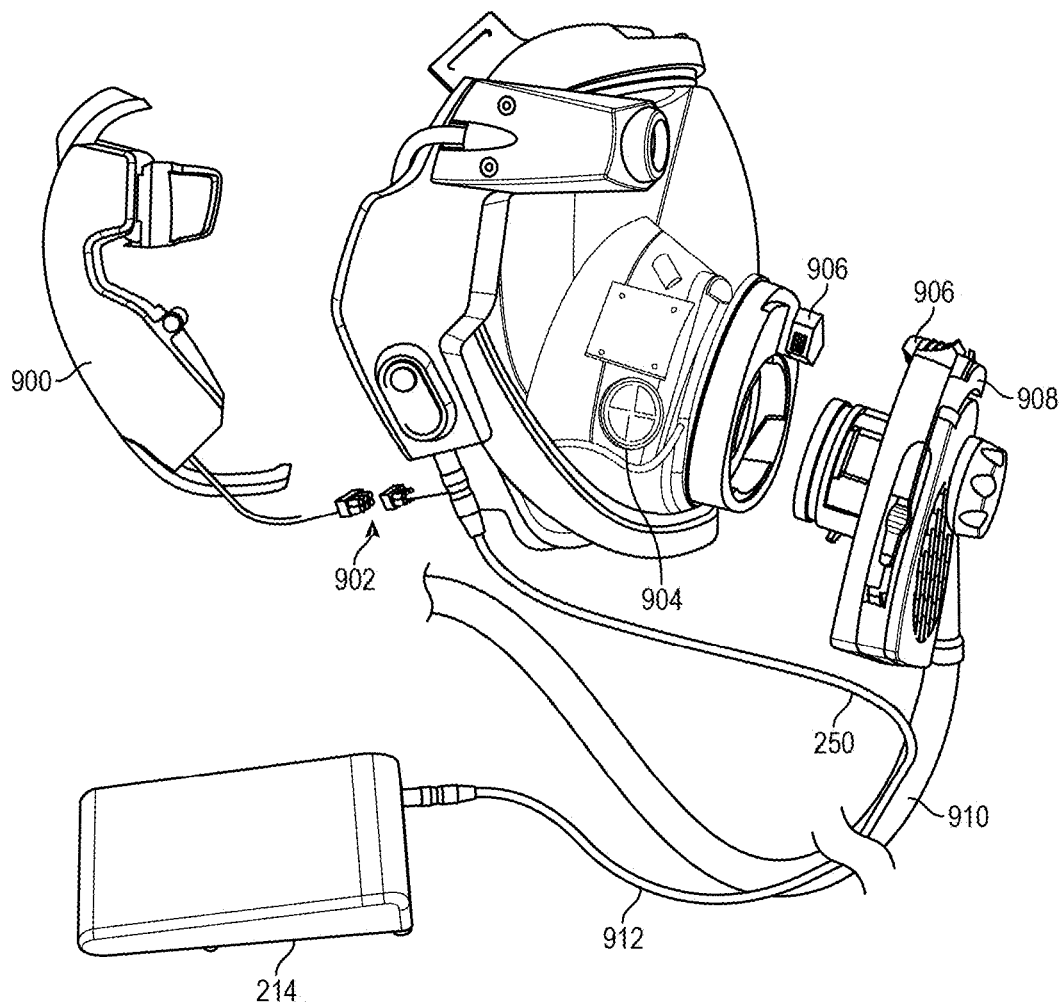
FIGS. 9A and 9B show a wired connection between the display unit and the computer complex of the sensor.

FIG. 9A illustrates a first embodiment of a wired connection between display unit 900 and the processor complex 214. In this embodiment, the display unit 900 is equipped with a pin plug and data cable 902. The pin plug and data cable 902 connects to a built-in pin connector system 904 in the mask. A regulator to mask pin connector system 906 on the outside of the face mask enables a clip-on data transfer between the in-mask built in pin connector system 904 and a regulator 908. The regulator to mask pin connector system 906 connects to data cables in hose line 910, at least one of which connects to the processor complex 214. In addition, the cable 250 from the TIC 212 to the processor complex 214 may also be routed within the hose line 910. In one embodiment data from the display unit 900 and data from the TIC 212 may be combined within the hose line 910 and input to the processor complex 214 via a single cable 912.

Figure 9B:
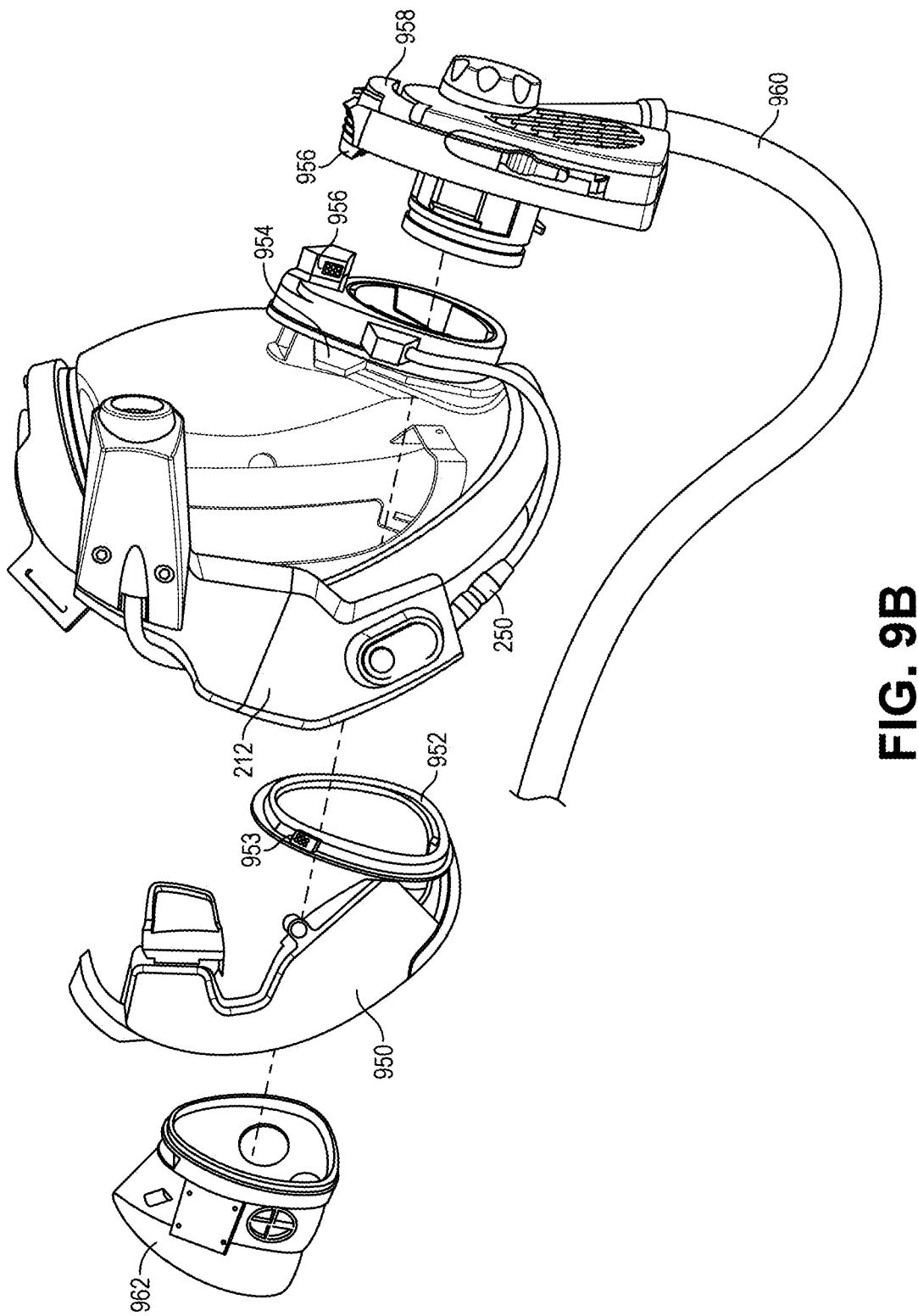

FIG. 9B illustrates a second embodiment of the wired connection between display unit and the computer complex. In the second embodiment, display unit 950 is equipped with a clip-in nose cup registration 952 and built-in data pins 953 that connect with the in-mask built-in pin connector system 954. Regulator to mask pin connector system 956 on the outside of the face mask enables a clip-on data transfer between the in-mask built-in pin connector system 954 and regulator 958. The regulator to mask pin connector system 956 connects to data cables in hose line 910, at least one of which connects to the processor complex 214. The cable 250 from the TIC 212 to the processor complex 214 (see FIG. 9A) may also be routed within the hose line 960. As shown in FIG. 9B, the clip-in nose cup registration has an opening to fit over a connection for the regulator 958. An inhalation connection 962 for the regulator 958 fits through the clip-in nose cup registration 952 to connect to the connection for the regulator 958 inside the mask.

A method and system for implementing a cognitive load reducing platform with a retrofittable mount system has been disclosed. The present invention has been described in accordance with the embodiments shown, and there could be variations to the embodiments, and any variations would be within the spirit and scope of the present invention. For example, the exemplary embodiment can be implemented using hardware, software, a computer readable medium containing program instructions, or a combination thereof. Accordingly, many modifications may be made by one of ordinary skill in the art without departing from the spirit and scope of the appended claims.

We claim:

1. A retrofittable mount system for a mask having a mask window, comprising:
   a sensor removably mounted to the mask to collect information about an environment as sensor data, wherein the sensor is removably mounted to the mask with a first mount mechanism that does not penetrate the mask window;
   a processor coupled to the sensor, wherein the processor executes one or more cognitive enhancement engines to process the sensor data into enhanced characterization data; and
   an output device removably mounted to the mask with a second mount mechanism without penetrating the mask window, the output device to electronically receive the enhanced characterization data from the processor and to communicate the enhanced characterization data to a wearer of the mask, such that the enhanced characterization data is integrated into natural senses of the wearer and optimized for performance of a specific task of the wearer to reduce a cognitive load of the wearer,
   wherein the second mount mechanism comprises a flexible bridge connecting a left frame member and a right frame member, wherein the left frame member and the right frame member have contours that substantially match contours of the interior of the mask, and wherein at least one of the left frame member and the right frame member are folded inwards about a vertical axis of the flexible bridge folded and then inserted into the mask, wherein once released the left frame member and the right frame member flex back to an original shape and press against the contours of an interior of mask.

2. The retrofittable mount system of claim 1, wherein the first mount mechanism removeably mounts the sensor through a latch mechanism.

3. The retrofittable mount system of claim 2, wherein the latch mechanism includes negative surface matching comprising a wedge formed in a housing of the sensor that fits over a flange portion of the mask, wherein the wedge acts as a retaining latch to keep the sensor fixed in place on the mask.

4. The retrofittable mount system of claim 2, wherein the latch mechanism comprises at least one of: a spring-loaded connector, a magnetic snap, a hook-and-loop fastener, a built-in flexible compliant hinge, and a clamp.

5. The retrofittable mount system of claim 1, wherein the second mount mechanism mounts the output device inside the mask in a fixed, but manually removable manner.

6. The retrofittable mount system of claim 1, wherein the mask is a component of a self-contained breathing apparatus (SOBA).

7. The retrofittable mount system of claim 6, wherein the sensor comprise a thermal imaging camera (TIC) and the one or more cognitive enhancement engines executed by the processor comprises one or more edge enhancement engines to processes thermal images from the TIC to enhance edges of objects and declutter information in the thermal images.

8. A method for providing a retrofittable mount system for a mask having a mask window, comprising:

removably mounting a sensor to the mask to collect information about an environment as sensor data, wherein the sensor is removably mounted to the mask with a first mount mechanism that does not penetrate the mask window;

coupling a processor to the sensor, wherein the processor executes one or more cognitive enhancement engines to process the sensor data into enhanced characterization data;

removably mounting an output device to the mask with a second mount mechanism without penetrating the mask window, the output device to electronically receive the enhanced characterization data from the processor and to communicate the enhanced characterization data to a wearer of the mask such that the enhanced characterization data to a wearer of the mask such that the enhanced characterization data is integrated into natural senses of the wearer and optimized for performance of a specific task of the wearer to reduce a cognitive load of the wearer;

implementing the second mount mechanism as a flexible bridge connecting a left frame member and a right frame member, wherein the left frame member and the right frame member have contours that substantially match contours of the interior of the mask; and implementing at least one of the left frame member and the right frame member to fold inwards about a vertical axis of the flexible bridge folded for insertion into the mask until the left frame member and the right frame member are placed against the contours of an interior of the mask.

9. The method claim 8, further comprising: removably mounting, by the first mount mechanism, the sensor through a latch mechanism.

10. The method claim 9, further comprising: implementing the latch mechanism with negative surface matching comprising as a wedge formed in a housing of the sensor that fits over a flange portion of the mask, wherein the wedge acts as a retaining latch to keep the sensor fixed in place on the mask.

11. The method claim 9, further comprising: implementing the latch mechanism as at least one of: a spring-loaded connector, a magnetic snap, a hook-and-loop fastener, a built-in flexible compliant hinge, and a clamp.

12. The method claim 8, further comprising: mounting, by the second mount mechanism, the output device inside the mask in a fixed, but manually removable manner.

13. The method of claim 8, further comprising: implementing the mask as a component of a self-contained breathing apparatus (SCBA).

14. The method claim 13, further comprising: implementing the sensor as a thermal imaging camera (TIC) and executing the one or more cognitive enhancement engines by the processor such that one or more edge enhancement engines processes thermal images from the TIC to enhance edges of objects and declutter information in the thermal images.

15. A retrofittable mount system for a mask of breathing apparatus, the mask having a mask window enclosed by a mask frame, comprising:

a thermal imaging camera (TIC) removably mounted to the mask to collect thermal images of an environment as sensor data, wherein the TIC is removably mounted to the mask with a first mount mechanism that does not penetrate the mask window;

a processor coupled to the sensor, wherein the processor executes one or more cognitive enhancement engines, including an edge enhancement engine, the edge enhancement engine to process the thermal images into enhanced characterization images that enhances edges of objects and declutters information in the thermal images; and a display unit removably mounted to the mask with a second mount mechanism without penetrating the mask window, the display unit configured to electronically receive the enhanced characterization images from the processor and to display the enhanced characterization images in a line of sight of a wearer, wherein the second mount mechanism comprises a flexible bridge connecting a left frame member and a right frame member, wherein the left frame member and the right frame member have contours that substantially match contours of the interior of the mask, and wherein at least one of the left frame member and the right frame member are folded inwards about a vertical axis of the flexible bridge folded and then inserted into the mask, wherein once released the left frame member and the right frame member flex back to an original shape and press against the contours of an interior of mask.

* * * * *